United States Patent
Ramasubramaniam et al.

(10) Patent No.: US 12,141,106 B2
(45) Date of Patent: Nov. 12, 2024

(54) FILE SYSTEM CLONING METHOD AND APPARATUS

(71) Applicant: HUAWEI TECHNOLOGIES CO., LTD., Guangdong (CN)

(72) Inventors: Vaiapuri Ramasubramaniam, Karnataka (IN); Xingkun Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/812,776

(22) Filed: Jul. 15, 2022

(65) Prior Publication Data

US 2022/0350779 A1    Nov. 3, 2022

Related U.S. Application Data

(63) Continuation of application No. PCT/CN2020/072724, filed on Jan. 17, 2020.

(51) Int. Cl.
   *G06F 16/00* (2019.01)
   *G06F 16/178* (2019.01)
   *G06F 16/182* (2019.01)

(52) U.S. Cl.
   CPC ........ *G06F 16/1844* (2019.01); *G06F 16/178* (2019.01)

(58) Field of Classification Search
   CPC .. G06F 16/1844; G06F 16/178; G06F 3/0604; G06F 3/0643; G06F 3/065
   See application file for complete search history.

(56) References Cited

U.S. PATENT DOCUMENTS

| | | | |
|---|---|---|---|
| 8,326,798 | B1 | 12/2012 | Driscoll et al. |
| 2004/0064488 | A1* | 4/2004 | Sinha .............. G06F 11/1451 |
| 2013/0054531 | A1 | 2/2013 | Susairaj et al. |
| 2013/0066930 | A1 | 3/2013 | Kamei et al. |
| 2013/0097402 | A1* | 4/2013 | Bao ............... G06F 12/0215 |
| | | | 711/205 |
| 2016/0210308 | A1* | 7/2016 | Shekhar ............ G06F 3/0619 |
| 2017/0123935 | A1* | 5/2017 | Pandit ............. G06F 16/2219 |
| 2017/0249329 | A1* | 8/2017 | Leverett ........... G06F 16/184 |
| 2017/0277602 | A1* | 9/2017 | Kumar ............ G06F 11/1471 |
| 2018/0196719 | A1* | 7/2018 | Glass ................ G06F 3/065 |

(Continued)

FOREIGN PATENT DOCUMENTS

| | | |
|---|---|---|
| CN | 101114232 A | 1/2008 |
| CN | 101789027 A | 7/2010 |

(Continued)

OTHER PUBLICATIONS

Office Action in Chinese Appln. No. 202080035974.7, dated Jul. 4, 2022, 19 pages (with English translation).

(Continued)

*Primary Examiner* — Alexander Khong
(74) *Attorney, Agent, or Firm* — Fish & Richardson P.C.

(57) ABSTRACT

A file system cloning method and apparatus is provided. In the method, a destination storage system first receives first information from a source storage system in which a file system runs. The first information is used to indicate a data layout of the file system. Then, the destination storage system creates a cloned file system of the file system based on the first information.

12 Claims, 7 Drawing Sheets

(56) References Cited

U.S. PATENT DOCUMENTS

2019/0026386 A1*  1/2019  McWaters ............... G06F 16/84
2019/0303035 A1* 10/2019  Danilov ................. G06F 3/067
2020/0341639 A1* 10/2020  Cason ................... G06F 3/0631

FOREIGN PATENT DOCUMENTS

| CN | 102111448 A | 6/2011 |
| --- | --- | --- |
| CN | 102307221 A | 1/2012 |
| CN | 103618765 A | 3/2014 |
| CN | 107046811 A | 8/2017 |
| CN | 107547648 A | 1/2018 |
| CN | 109460182 A | 3/2019 |

OTHER PUBLICATIONS

Extended European Search Report in European Appln No. 20913616.7, dated Dec. 7, 2022, 7 pages.
International Search Report and Written Opinion in International Appln. No. PCT/CN2020/072724, mailed on Sep. 28, 2020, 16 pages (with English translation).

* cited by examiner

FILE SYSTEM CLONING METHOD AND APPARATUS

CROSS-REFERENCE TO RELATED APPLICATIONS

This application is a continuation of International Application No. PCT/CN2020/072724, filed on Jan. 17, 2020. The disclosure of which is hereby incorporated by reference in its entirety.

TECHNICAL FIELD

This application relates to the field of storage technologies, and in particular, to a file system cloning method and apparatus.

BACKGROUND

Cloud bursting is a widely used application deployment architecture in a storage system. A main idea of the cloud bursting is that an application deployed in a local storage system can be migrated to a public cloud when a large quantity of resources (such as computing or storage resources) are required. Resources in the public cloud are used for processing, to save resources of the local storage system.

Before the application is used on the public cloud, all data related to the application needs to be migrated to the public cloud. For example, all data in the local storage system may need to be migrated to the public cloud. However, data migration takes time. Especially, when an amount of data that needs to be migrated is relatively large, longer time is taken to wait for the data migration. Consequently, a processing delay is relatively long, and use of a user is affected.

SUMMARY

This application provides a file system cloning method and apparatus, to resolve a problem of a relatively long delay in an application migration process.

According to a first aspect, a file system cloning method is provided. In the method, a destination storage system first receives first information from a source storage system in which a file system runs. The first information is used to indicate a data layout of the file system. Then, the destination storage system creates a cloned file system of the file system based on the first information.

In the foregoing technical solution, after the destination storage system creates the cloned file system corresponding to the file system in the source storage system, an application running on the file system in the source storage system can also run on the cloned file system. Only a data layout of a source file system is required for creating the cloned file system, and before receiving a data obtaining request sent by the destination storage system, the source storage system does not send data included in any file to the destination storage system. In other words, data of a file included in the file system does not need to be transmitted, and an amount of data in the data layout is less than an amount of data included in the file. In this way, a delay in an application migration process can be reduced.

In a possible design, the first information may include but is not limited to the following two types of content:

First, the first information includes metadata of all files in the file system.

In the foregoing technical solution, if metadata in the source storage system and metadata in the destination storage system are described in a same manner, the data layout of the file system may be directly indicated by using the metadata. This implementation is simple.

Second, the first information includes semantic analysis information of the metadata of all the files in the file system. Semantic analysis information of metadata of each file includes an identifier of the metadata of the file, an operation corresponding to the metadata of the file, and data required for creating the metadata of the file.

In the foregoing technical solution, if the metadata in the source storage system and the metadata in the destination storage system are described in different manners, the data layout of the file system may be indicated by using the semantic analysis information of the metadata, to improve applicability of the solution. Certainly, if the metadata in the source storage system and the metadata in the destination storage system are described in the same manner, this manner may also be used to indicate the data layout of the file system. This is not limited herein.

Further, either of the foregoing two types of content may be used to indicate the data layout of the file system, to improve flexibility of the solution.

In a possible design, the destination storage system may further receive second information sent by the source storage system. The second information includes metadata of a changed file in the file system or semantic analysis information of the metadata of the changed file. Then, the destination storage system updates the cloned file system based on the second information.

In the foregoing technical solution, after the file in the source storage system is changed, the metadata of the changed file or the semantic analysis information of the metadata may be sent to the destination storage system, to update the cloned file system and implement incremental update.

In a possible design, after the destination storage system receives a data read request including an identifier of a to-be-read data block, when the destination storage system determines that the to-be-read data block is not stored in the destination storage system, the destination storage system may send a first data obtaining request to the source storage system, to obtain the to-be-read data block. The first data obtaining request includes the identifier of the to-be-read data block. After receiving the to-be-read data block from the source storage system, the destination storage system may store the to-be-read data block.

In the foregoing technical solution, the destination storage system may obtain a data block from the source storage system as required, to meet a use requirement of a user. In this way, an unnecessary data block does not need to be sent to the destination storage system, to reduce an amount of data transmitted between the source storage system and the destination storage system.

In a possible design, after receiving the data read request, the destination storage system may further determine a pre-read data block according to a prefetch rule and the data read request, and send a second data obtaining request including an identifier of the pre-read data block to the source storage system, to obtain the pre-read data block. After receiving the pre-read data block from the source storage system, the destination storage system stores the pre-read data block in the destination storage system.

In the foregoing technical solution, the destination storage system may prefetch some data blocks and store the data blocks in the destination storage system, so that when the data read request for the pre-read data block is subsequently received, the data block may be directly read locally. This reduces a response delay.

According to a second aspect, a file system cloning apparatus is provided. The file system cloning apparatus may be a management node or a management service end, or an apparatus in a management node or a management service end. The file system cloning apparatus includes a processor, to implement the method described in the first aspect. The file system cloning apparatus may further include a memory, to store a program instruction and data. The memory is coupled to the processor. The processor may invoke and execute the program instruction stored in the memory, to implement any one of the methods described in the first aspect.

In a possible design, the processor of the file system cloning apparatus executes the program instruction in the memory, to implement the following functions:

- receiving first information sent by a source storage system, where a file system runs in the source storage system, and the first information is used to indicate a data layout of the file system; and
- creating a cloned file system of the file system based on the first information.

In a possible design, description of the first information is similar to corresponding content in the first aspect, and details are not described herein again.

In a possible design, the processor executes the program instruction stored in the memory, to implement the following functions:

- receiving second information sent by the source storage system, where the second information includes metadata of a changed file in the file system or semantic analysis information of the metadata of the changed file; and
- updating the cloned file system based on the second information.

In a possible design, the processor executes the program instruction stored in the memory, to implement the following functions:

- receiving a data read request, where the data read request includes an identifier of a to-be-read data block;
- when it is determined that the to-be-read data block is not stored in the destination storage system, sending a first data obtaining request to the source storage system, where the first data obtaining request includes the identifier of the to-be-read data block; and
- receiving the to-be-read data block from the source storage system, and storing the to-be-read data block.

In a possible design, the processor executes the program instruction stored in the memory, to implement the following functions:

- determining a pre-read data block according to a prefetch rule and the data read request;
- sending a second data obtaining request to the source storage system, where the second data obtaining request includes an identifier of the pre-read data block; and
- receiving the pre-read data block from the source storage system, and storing the pre-read data block in the destination storage system.

According to a third aspect, a file system cloning apparatus is provided. The file system cloning apparatus may be a management node or a management service end, or an apparatus in a management node or a management service end. The file system cloning apparatus may include a transceiver unit and a creation unit. These units may perform corresponding functions performed in any one of the design examples of the first aspect. Details are as follows:

The transceiver unit is configured to receive first information sent by a source storage system, where a file system runs in the source storage system, and the first information is used to indicate a data layout of the file system.

The creation unit is configured to create a cloned file system of the file system based on the first information.

According to a fourth aspect, an embodiment of this application provides a computer-readable storage medium. The computer-readable storage medium stores a computer program. The computer program includes a program instruction. When the program instruction is executed by a computer, the computer is enabled to perform the method according to any one of the first aspect and the possible designs of the first aspect.

According to a fifth aspect, an embodiment of this application provides a computer program product. The computer program product stores a computer program. The computer program includes a program instruction. When the program instruction is executed by a computer, the computer is enabled to perform the method according to any one of the first aspect and the possible designs of the first aspect.

According to a sixth aspect, this application provides a chip system. The chip system includes a processor, and may further include a memory, to implement the method according to the first aspect. The chip system may include a chip, or may include a chip and another discrete component.

According to a seventh aspect, an embodiment of this application provides a storage system. The storage system includes a source storage system and the file system cloning apparatus according to any one of the second aspect and the designs of the second aspect. Alternatively, the storage system includes the source storage system and the file system cloning apparatus according to any one of the third aspect and the designs of the third aspect.

For beneficial effects of the second aspect to the seventh aspect and the implementations of the second aspect to the seventh aspect, refer to the descriptions of the beneficial effects of the method in the first aspect and the implementations of the first aspect.

DESCRIPTION OF EMBODIMENTS

To make the objectives, technical solutions, and advantages of the embodiments of this application clearer, the following further describes the embodiments of this application in detail with reference to the accompanying drawings.

"A plurality of" in the embodiments of this application means two or more than two. In view of this, "a plurality of" in the embodiments of this application may also be understood as "at least two". "At least one" may be understood as one or more, for example, understood as one, two, or more. For example, "including at least one" means including one, two, or more, and does not limit what are included. For example, "including at least one of A, B, and C" may represent the following cases: A is included, B is included, C is included, A and B are included, A and C are included, B and C are included, or A, B and C are included. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In the embodiments of this application, the "node" and the "device" may be used interchangeably.

Unless otherwise stated, in the embodiments of this application, ordinal numbers such as "first" and "second" are used to distinguish between a plurality of objects, and not intended to limit a sequence, a time sequence, a priority, or an importance of the plurality of objects.

Figure 1:
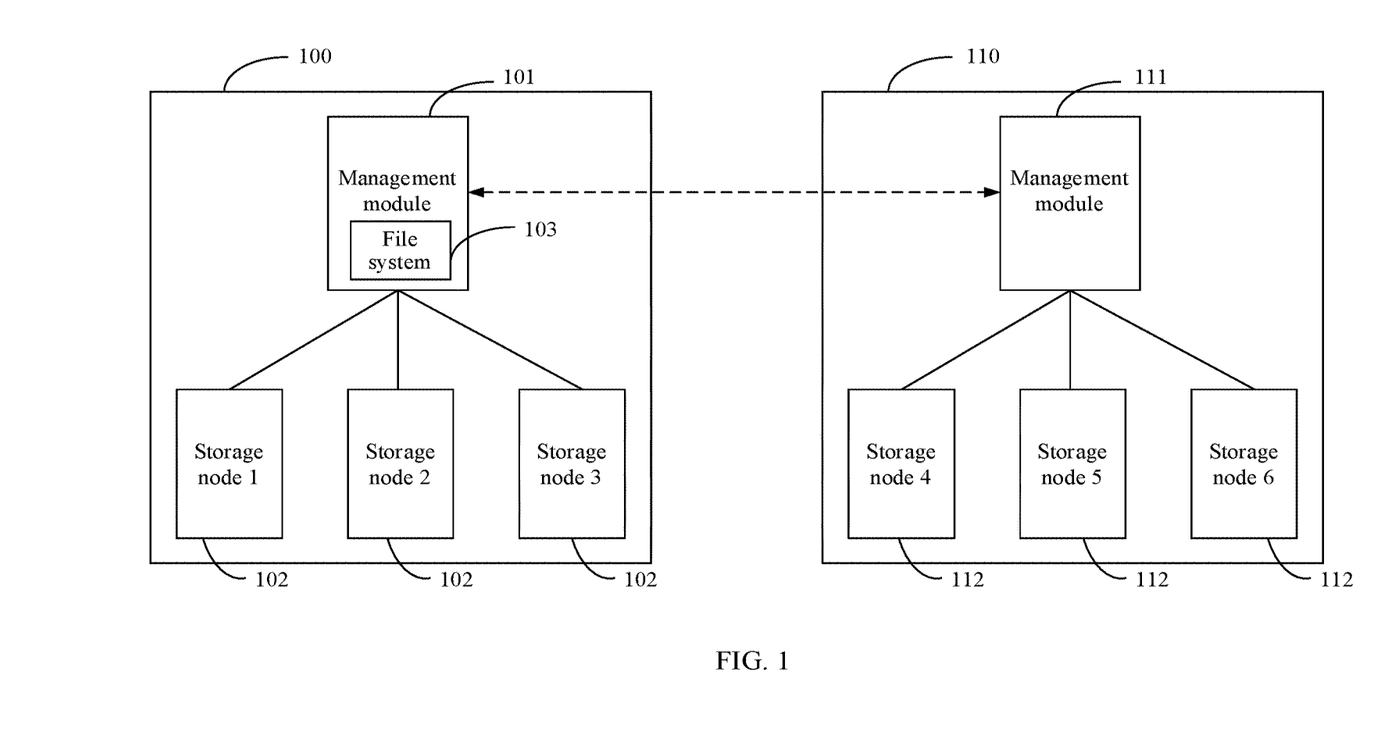
FIG. 1 is a schematic diagram of an example of an application scenario according to an embodiment of this application.

A file system cloning method provided in the embodiments of this application may be applied to two storage systems. FIG. 1 is a schematic diagram of an example of an application scenario according to an embodiment of this application. In FIG. 1, a storage system 100 and a storage system 110 are included. The storage system 100 includes a management module 101 and at least one storage node 102 (in FIG. 1, three storage nodes 102, which are respectively a storage node 1 to a storage node 3, are used as an example). The management module 101 is configured to write data into each storage node 102, and read data from the at least one storage node 102.

The storage node 102 in FIG. 1 may be an independent server, or a storage array including at least one storage device. The storage device may be a hard disk drive (HDD) disk device, a solid state drive (SSD) disk device, a serial advanced technology attachment (SATA) disk device, a small computer system interface (SCSI) disk device, a serial attached SCSI (SAS) disk device, or a fiber channel (FC) disk device.

The management module 101 in FIG. 1 may be an independent server or controller, or the like. The management module 101 and the at least one storage node 102 may be devices independent of each other. For example, the management module 101 is an independent server. Alternatively, the management module 101 may be a software module deployed on a storage node 102. For example, the management module 101 and the storage node 102 run on a same server. Specific forms of the management module 101 and the storage node 102 are not limited herein. In FIG. 1, an example in which the management module 101 and the storage node 102 are devices independent of each other is used for description.

The storage system 100 includes a file system 103. The management module 101 runs the file system 103 to control manners of writing data into the storage node 102 and reading data from the storage node 102. If there is no file system, information placed in storage space of the at least one storage node 102 is a large data body, and a start location and an end location of one piece of information cannot be distinguished. Separating the data and naming each piece of data make it easy to separate and identify the information. The data is named based on a naming manner of a paper information system. Each group of data is referred to as a "file". A structure and a logical rule that are used to manage groups of information and names of the groups are referred to as a "file system". Accordingly, the file system 103 is responsible for collating files and tracking when the files are changed. Further, the file system 103 stores metadata of all files. Metadata of each file includes information such as a file name, a file ID (for example, an index node number), a size of a file data block, a location at which the file is stored in a disk, a timestamp of file creation, and a plurality of timestamps of writing data blocks into the disk. The metadata of all the files in the file system 103 is stored on the at least one storage node 102 in a distributed manner.

A hardware architecture of the storage system 110 is similar to a hardware architecture of the storage system 100. For example, the storage system 110 includes a management module 111 and at least one storage node 112 (which are respectively a storage node 4 to a storage node 6). The management module 111 is similar to the management module 101. The at least one storage node 112 is similar to the at least one storage node 102. Details are not described herein again.

Before the file system is created, storage space used to store data required by the file system may be reserved in the storage system 110. A size of the storage space may be preset, or may be determined by the management module 111. The storage space is distributed on all storage nodes 112 or some storage nodes 112 in the destination storage system 110. In addition, metadata of files in different types of file systems is described in different manners. An administrator may configure a type and an attribute of the file system through the management module 111. For example, the type of the file system may be a FAT 32 file system using a 32-bit file allocation table (FAT) or a new technology file system (NTFS) or a third extended file system (ETX3). The attribute of the file system may include whether the file system is a read-only file system or a readable and writable file system.

In the application scenario shown in FIG. 1, the storage system 100 is a distributed storage system, and the storage system 110 is also a distributed storage system. In another application scenario, the storage system 100 or the storage system 110 may be a centralized storage system. In some other application scenarios, the storage system 110 may alternatively be a cloud storage system such as a public cloud or a private cloud, or both the storage system 100 and the storage system 110 are cloud storage systems. This is not limited herein.

Figure 2:
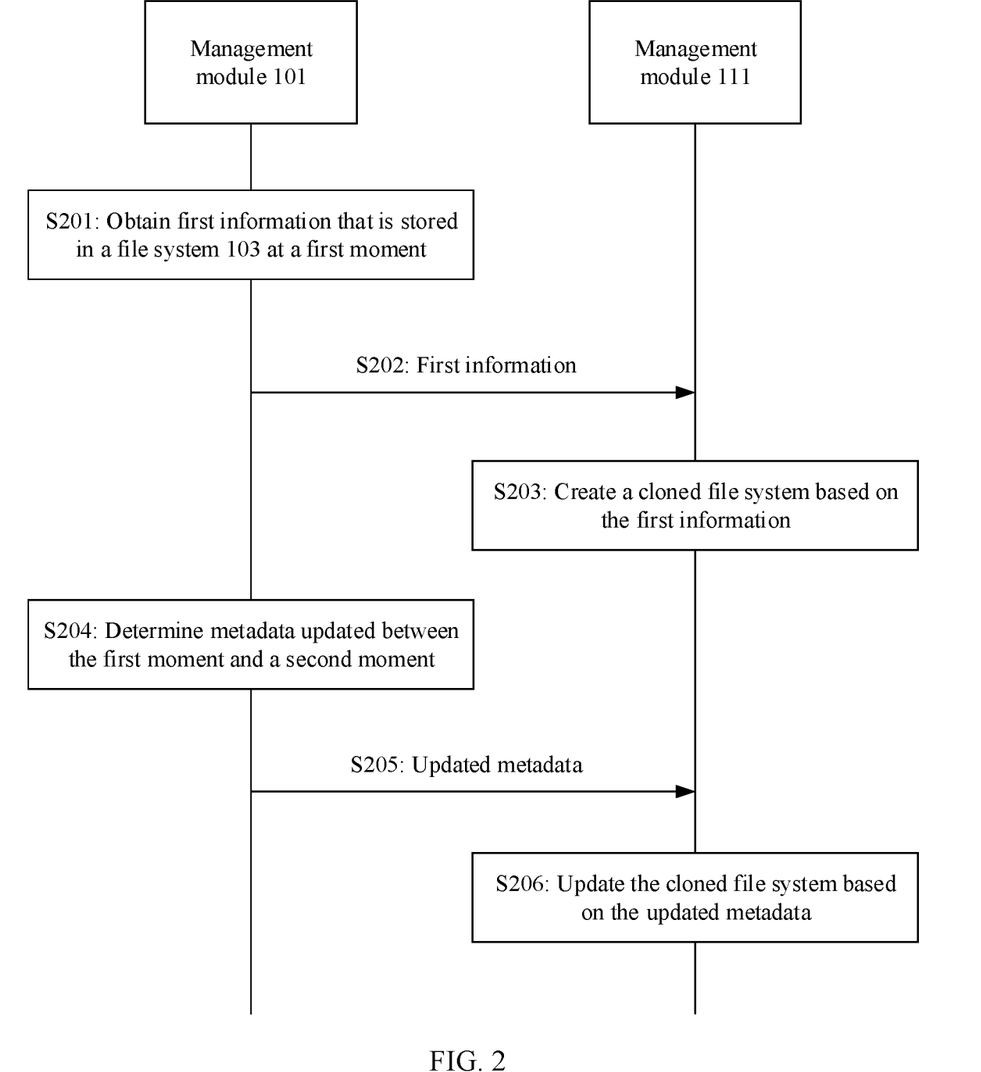
FIG. 2 is a flowchart of a file system cloning method according to an embodiment of this application.

The following uses the application scenario shown in FIG. 1 as an example to describe the file system cloning method in the embodiments of this application. FIG. 2 is a flowchart of the method. The flowchart is described as follows:

S201: The management module 101 obtains first information that is stored in the file system 103 at a first moment.

In this embodiment of this application, the first information is used to indicate a data layout of the file system 103. The first moment may be used to generally refer to any moment. For example, the management module 101 may obtain the first information based on a clone request received from a client that communicates with the storage system 100. In this case, the first moment may be a moment after the clone request is received. Alternatively, the management module 101 may periodically and actively obtain the first information. In this case, the first moment may be a start moment of any period. This is not limited herein.

That the management module 101 obtains the first information may include but is not limited to the following two manners:

A first obtaining manner is as follows:

Because information such as the file name, the file ID, a file size, and the location at which the file is located in the disk is recorded in the metadata of each file in the source storage system 100, if the metadata of all the files in the file system 103 is obtained and identified, the data layout of the file system 103 may be obtained. For example, the file system 103 includes metadata corresponding to a directory A, a metadata corresponding to a file a, metadata corresponding to a directory B, and metadata corresponding to a file b. The metadata corresponding to the directory A includes a name of the directory A, an ID of a file and an ID of a directory (the directory B) that are included in the directory A, a size of the file included in the directory A, a size of a data block included in the directory A, or the like. The metadata corresponding to the file a includes a name of the file a, a size of the file a, a size of a data block included in the file a, or the like. The metadata corresponding to the directory B includes a name of the directory B, an ID of a file included in the directory B, a size of a data block included in the directory B, or the like. The metadata corresponding to the file b includes a name of the file b, a size of the file b, a size of a data block included in the file b, or the like. For the foregoing information, refer to a data layout shown in FIG. 3. Therefore, in this manner, the first information is the metadata of all the files in the file system 103.

In an example, the management module 101 may obtain, in a manner of creating a snapshot for the file system 103, metadata of all the files that are stored in the file system 103 at the first moment. For example, the first information, obtained by the management module 101, that is stored in the file system 103 at the first moment is the metadata corresponding to the directory A, the metadata corresponding to the file a, the metadata corresponding to the directory B, and the metadata corresponding to the file b. Content included in each piece of metadata is similar to the foregoing content, and details are not described herein again.

It can be learned from the first obtaining manner that the data layout of the file system 103 may be obtained by using the metadata of all the files in the file system 103. However, it can be learned from the foregoing description of the file system that the metadata of the files in the different types of file systems is described in different manners. Therefore, a prerequisite for implementing the first manner is that a management module (for example, the management module 111 of the storage system 110) that receives the first information describes metadata of a file in a same manner. If the management module that receives the file in a different manner, the management module that receives the first information cannot obtain correct metadata.

In view of this, a second obtaining manner is provided, and details are as follows:

After obtaining metadata of all the files/directories that are stored in the file system 103 at the first moment, the management module 101 may perform semantic analysis on the metadata of each file, and generate semantic analysis information corresponding to the metadata of each file. Each piece of semantic analysis information includes an identifier of the metadata, an operation corresponding to the metadata, and data required for creating the metadata. The identifier of the metadata and the data required for creating the metadata may be obtained from the metadata of each file, and details are not described herein again. The following describes the operation, corresponding to the metadata, that is in the semantic analysis information.

In this embodiment of this application, in addition to the foregoing content included in the metadata of each file, information used to indicate a type of the metadata is further recorded in a block header or a data integrity field (DIF) of the metadata of each file. The type of the metadata may include a data type, a directory type, an access permission type, and the like. Types of the metadata may be classified by the management module 101 based on different file names of files corresponding to the metadata or different content included in file data blocks. For example, if a file name of a file includes a "file" field, the management module 101 determines that a type of metadata corresponding to the file is the data type. Alternatively, if a file data block of a file is user data, the management module 101 determines that a type of metadata corresponding to the file is the data type. Certainly, the type of the metadata of each file may alternatively be determined in another manner, and details are not described herein.

Then, the management module 101 may determine, based on the type of the metadata of each file, an operation corresponding to the metadata of each file. In the file system 103, different types of metadata correspond to different operations. For example, the file system 103 may include different metadata creation functions. When metadata of the data type is created, a corresponding metadata creation function may be a function X. In this case, an operation corresponding to the metadata of the data type is an operation of invoking the function X. When metadata of the directory type is created, a corresponding metadata creation function is a function Y. In this case, an operation corresponding to the metadata of the directory type is an operation of invoking the function Y.

In this manner, the first information is semantic analysis information of the metadata of all the files in the file system 103 in the storage system 100.

In an example, the foregoing example is still used. The file system 103 includes the metadata corresponding to the directory A, the metadata corresponding to the file a, the metadata corresponding to the directory B, and the metadata corresponding to the file b. After obtaining the metadata corresponding to the directory A, the management module 101 performs semantic analysis on the metadata. In this case, obtained semantic analysis information of the metadata corresponding to the directory A is as follows: An identifier of the metadata is the directory A; data required for creating the metadata corresponding to the directory A is that the ID of the file and the ID of the directory that are included in the directory A are respectively an ID of the file a and an ID of the directory B; and the size of the data block is 2 MB. Then, the management module 101 may determine, based on a block header or a data integrity field DIF of the metadata, that a type of the metadata is the directory type, and further determine that an operation on the metadata is the operation of invoking the function X. In this case, the obtained semantic analysis information of the metadata corresponding to the directory A is as follows: The function X is invoked to create metadata, where an identifier of the metadata is the directory A, a size of a data block is 2 MB, and the metadata includes the file a and the directory B. Semantic analysis is performed on metadata of another file in a same manner, and details are not described herein again.

In a possible implementation, when the metadata of the files in the file system 103 is stored on the storage nodes 102 in a distributed manner, the management module 101 may send a snapshot obtaining request to each storage node 102. After receiving the snapshot obtaining request, each storage node 102 creates a snapshot for metadata of a file stored in the storage node 102, and sends the obtained snapshot of the metadata to the management module 101, so that the management module 101 obtains, from the snapshot corresponding to each storage node 102, the metadata stored in the file system 103 at the first moment.

In another possible implementation, in the storage system 100, storage space corresponding to the at least one storage node 102 may be divided into a plurality of domains. For example, the storage node 1 may include two domains, the storage node 2 may include three domains, and data in each domain may be independently managed. For example, the management module 101 may perform a hash operation based on the file name and the ID of the metadata of each file to obtain a domain name corresponding to the metadata of each file, and then store the metadata in a corresponding domain. The data in each domain may be independently managed. Therefore, each storage node 102 may separately create a snapshot for metadata of a file stored in each domain, to obtain snapshots of metadata corresponding to a plurality of domains included on the storage node 102. Then, the first obtaining manner or the second obtaining manner is used to obtain the metadata of the file in each domain or parsing information of the metadata.

S202: The management module 101 of the storage system 100 sends the first information to the management module 111 of the storage system 110.

The management module 101 may sequentially send the first information. Alternatively, the management module 101 may divide the first information into a plurality of pieces of information based on a source (from different storage nodes or different domains) of each piece of information in the first information, and send the plurality of pieces of information in parallel, so that a data transmission speed can be increased. This is not limited herein.

S203: The management module 111 of the storage system 110 creates a cloned file system based on the first information.

Based on different content in the first information, manners in which the management module 111 of the storage system 110 creates the cloned file system based on the first information are also different. The manners may include but are not limited to the following two manners.

Figure 3:
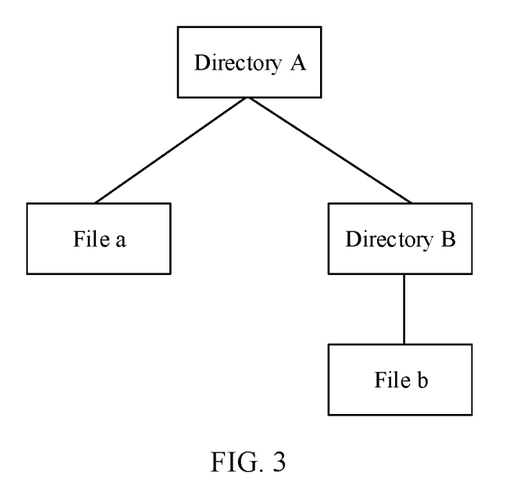
FIG. 3 is a schematic diagram of an example of a data layout of a file system according to an embodiment of this application.

A first creation manner is as follows:

When the first information is the metadata of all the files in the file system 103, the management module 111 obtains the metadata corresponding to the files from the first information, and then the management module 111 may create cloned metadata in the storage space that is reserved in the storage system 110 and that is used to store the data required by the file system. After cloned metadata of all the files is created, a cloned file system shown in FIG. 3 is obtained.

The plurality of pieces of cloned metadata may be created on a same storage node, or may be separately created on different storage nodes. In this embodiment of this application, a storage node on which the cloned metadata is located is not limited.

A second creation manner is as follows:

When the first information is the semantic analysis information of the metadata of all the files in the file system 103, the management module 111 creates cloned metadata on a corresponding storage node 112 based on an operation indicated in each piece of semantic analysis information and the data required for creating the metadata.

In an example, the management module 111 obtains four pieces of semantic analysis information from the first information. Content of each piece of semantic analysis information is the same as the foregoing content, and details are not described herein again. In this case, the management module 111 creates cloned metadata corresponding to the four pieces of semantic analysis information, and establishes, based on an ID of a file and/or an ID of a directory that are/is included in metadata of each directory type, an association relationship between the cloned metadata. For example, if an ID of a file and an ID of a directory that are included in the semantic analysis information corresponding to the metadata of the directory A are respectively the ID of the file a and the ID of the directory B, the management module 111 establishes an association relationship between the directory A, the file a, and the directory B, and establishes an association relationship between the directory B and the file b in a same processing manner. In this way, the cloned file system shown in FIG. 3 is obtained.

In some other embodiments, when cloning the metadata of each file, the management module 111 may update a file name of each file according to a preset rule. For example, if a file name in metadata of a file is the directory A, when cloning the metadata of the file, the management module 111 may update the file name to a directory A', to create metadata of the directory A', and establish a one-to-one mapping relationship between source metadata and the cloned metadata (for example, the metadata of the directory A and the metadata of the directory A'). Metadata of another file is also processed in a same manner, to obtain a cloned file system shown in (a) in FIG. 4.

The foregoing technical solution provides a solution of creating the cloned file system based on the metadata of the file system, and the cloned file system can be created in the destination storage system by only sending metadata in the source storage system to the destination storage system without copying any user data, so that an amount of transmitted data can be reduced, and efficiency of cloning the file system can be improved.

Because the data in the file system dynamically changes, the cloned file system in the storage system 110 further supports an incremental update operation. A flowchart shown in FIG. 2 further includes the following steps.

S204: The management module 101 of the storage system 100 determines metadata updated between the first moment and a second moment.

The second moment may be any moment after the first moment. Alternatively, if the management module 101 periodically obtains updated metadata in the file system 103, the second moment is a start moment of a period. The management module 101 may obtain a snapshot of the file system 103 that is at the second moment, and then compare an obtained snapshot for the first moment with the obtained snapshot for the second moment, to obtain the metadata updated between the first moment and the second moment.

The updated metadata may include but is not limited to the following two cases:

In a first case, the data layout of the file system 103 remains unchanged, and the metadata changes because a data block changes. For example, the file system 103 includes, at the first moment, the metadata corresponding to the directory A, the metadata corresponding to the file a, the metadata corresponding to the directory B, and the metadata corresponding to the file b. Content included in the metadata of each file is described above, and details are not described herein again. After the first moment, the management module 101 updates a data block of the file a based on an operation of the client, for example, updates the file a from a data block 1 to a data block 2. Because the data block changes, the metadata corresponding to the file a also changes. In this case, metadata corresponding to the file a that includes the data block 2 is the updated metadata.

In a second case, the data layout changes due to a newly added file. For example, after the first moment, the file system 103 adds a new file c to the directory B, so that metadata corresponding to the file c is added to the file system 103. A file name included in the metadata corresponding to the file c is the file c, and a size of a data block is 1 MB. In this case, the metadata corresponding to the file c is the updated metadata.

Certainly, the updated metadata may further include another case, and examples are not listed one by one herein.

S205: The management module 101 sends the updated metadata to the management module 111 of the storage system 110.

After obtaining the updated metadata, the management module 101 may send the updated metadata or semantic analysis information of the updated metadata to the management module 111. In FIG. 2, sending the metadata is used as an example for description. For example, the metadata corresponding to the file a that includes the data block 2 and the metadata corresponding to the file c are sent to the management module 111.

S206: The management module 111 of the storage system 110 updates the cloned file system based on the updated metadata.

After receiving the updated metadata, the management module 111 may first determine whether the updated metadata is metadata corresponding to the newly added file or metadata generated by updating an existing file, and then perform a corresponding operation based on a determining result. If the updated metadata is the metadata generated by updating the existing file, the management module 111 first deletes old metadata corresponding to the updated metadata in the cloned file system, and then creates new cloned metadata of the file in the cloned file system based on the updated metadata. If the updated metadata is the metadata corresponding to the newly added file, the management module 111 directly creates cloned metadata in the cloned file system based on the updated metadata.

For example, the management module 111 queries file names of all metadata stored in the storage system 110, and determines whether metadata whose file name is the same as a file name of the updated metadata exists in the cloned file system. If the metadata exists, it indicates that the updated metadata is the metadata generated by updating the existing file. For example, the file name included in the updated metadata is the file a. If the management module 111 determines that cloned metadata corresponding to the file a already exists in the cloned file system, the management module 111 deletes the metadata corresponding to the file a in the cloned file system, and then recreates, based on the updated metadata, cloned metadata corresponding to the file a. For ease of description, the cloned metadata that is corresponding to the file a and that is created based on the updated metadata is marked as metadata corresponding to a file a". Then, the management module 111 establishes a mapping relationship between the metadata corresponding to the file a and the metadata corresponding to the file a", to obtain a data layout shown in (b) in FIG. 4.

If the management module 111 queries the file names of all the metadata stored in the storage system 110, and determines that no metadata whose file name is the same as the file name of the updated metadata exists in the cloned file system, the updated metadata is the metadata corresponding to the newly added file. For example, if the management module 111 determines that the cloned file system does not include cloned metadata corresponding to the file c, the management module 111 creates, in the cloned file system and based on the updated metadata, the cloned metadata corresponding to the file c, to obtain a data layout shown in (c) in FIG. 4.

In the foregoing technical solution, the source storage system may send the updated metadata to the destination storage system, to maintain data consistency between a source file system and the cloned file system.

The cloned file system created in the storage system 110 may provide data access for a user. The following separately describes a process in which the cloned file system processes a data read request and a process in which the cloned file system processes a write request.

Figure 5:
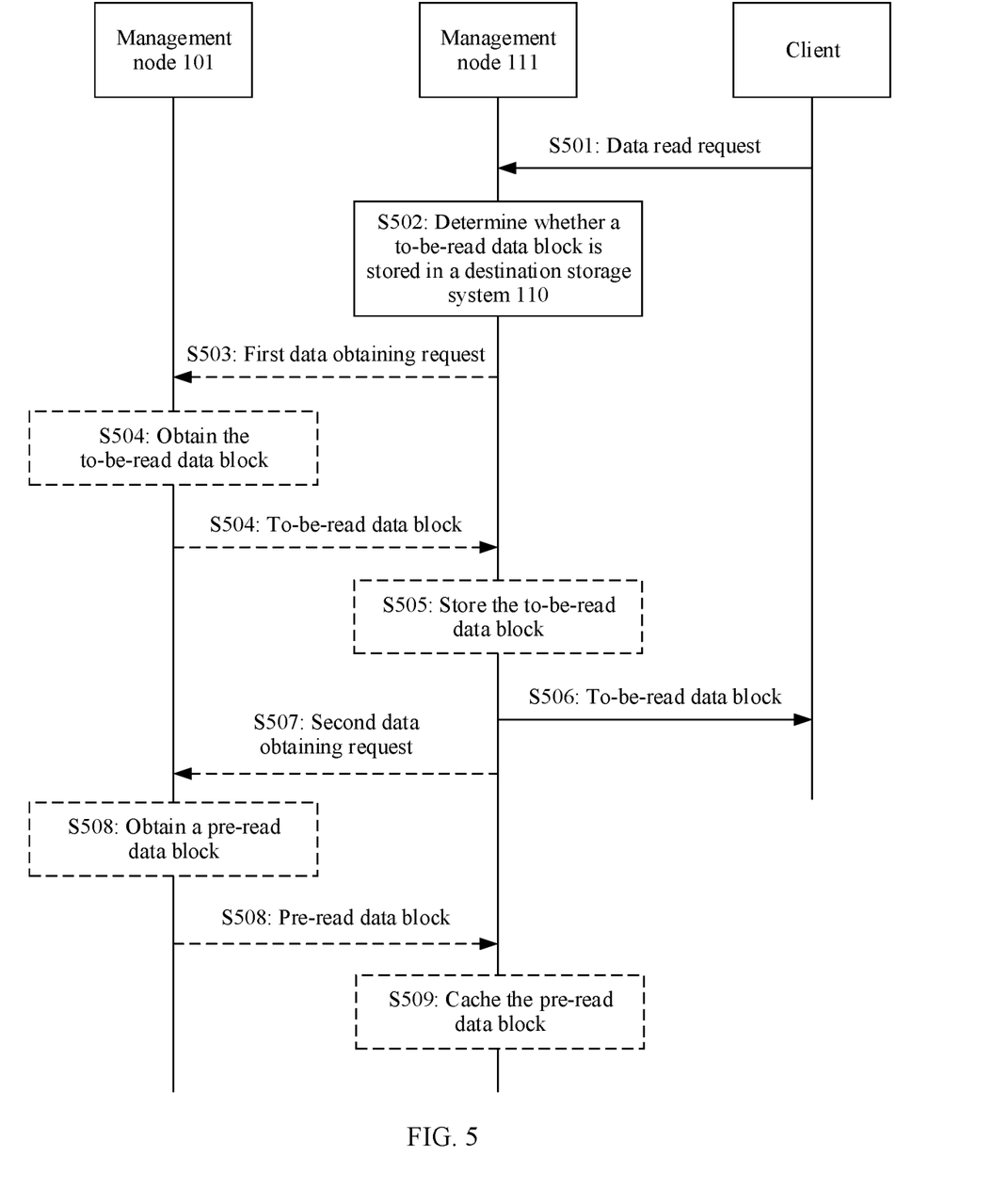
FIG. 5 is a flowchart of processing a data read request by a cloned file system according to an embodiment of this application.

FIG. 5 is a flowchart of processing the data read request by the cloned file system. The flowchart is described as follows:

S501: The management module 111 of the storage system 110 receives a data read request sent by the client, where the data read request includes an identifier of a to-be-read data block.

In this embodiment of this application, the identifier of the to-be-read data block includes a file name of a file to which the to-be-read data block belongs, and a start address and a length of the to-be-read data block. The start address of the to-be-read data block may be indicated by an offset from an initial address (0). The length of the to-be-read data block may be a quantity of fixed-size data blocks (for example, 8 KB data blocks). In an example, the identifier of the to-be-read data block includes the file a, the start address is 0, and the length is 10. In other words, the to-be-read data block is a first 80 KB data block of the file a.

S502: The management module 111 determines whether the to-be-read data block is stored in the storage system 110.

For the metadata of the data type, after creating cloned metadata in the storage system 110, the management module 111 may further create a bitmap or a bit-tree corresponding to the cloned metadata. The bitmap or the bit-tree is used to indicate whether a data block corresponding to the metadata is stored in storage space corresponding to the cloned metadata. The bitmap is used as an example. The bitmap may include a plurality of bits, and each bit is used to indicate whether a data block is stored in a physical address segment with a fixed size. For example, the fixed size is a size (for example, 4 KB) of a sector, and a size of the data block of the file a is 160 KB. In this case, a bitmap corresponding to the file a includes 40 bits. The data block of the file a is stored in a first disk of the storage node 4, and a start address is 0. In this case, a first bit is used to indicate whether the data block is stored in a first sector of the first disk, a second bit is used to indicate whether a data block is stored in a second sector of the first disk, and so on. Because only the metadata of the file system 103 is cloned in the storage system 110, after the cloning method shown in FIG. 2 is performed by the storage system 110, the data block of the file a may not be stored in the storage system 110. In this case, each bit in the bitmap corresponding to the file a indicates that no data block is stored in a corresponding physical address segment. For example, values of the 40 bits corresponding to the file a are all 0.

In an example, when the management module 111 determines that the to-be-read data block is the first 80 KB data block of the file a, the management module 111 first determines whether values of first 20 bits in the bitmap corresponding to the file a are 0. If the values are 0, the management module 111 determines that the to-be-read data block is not stored in the storage system 110.

Figure 4:
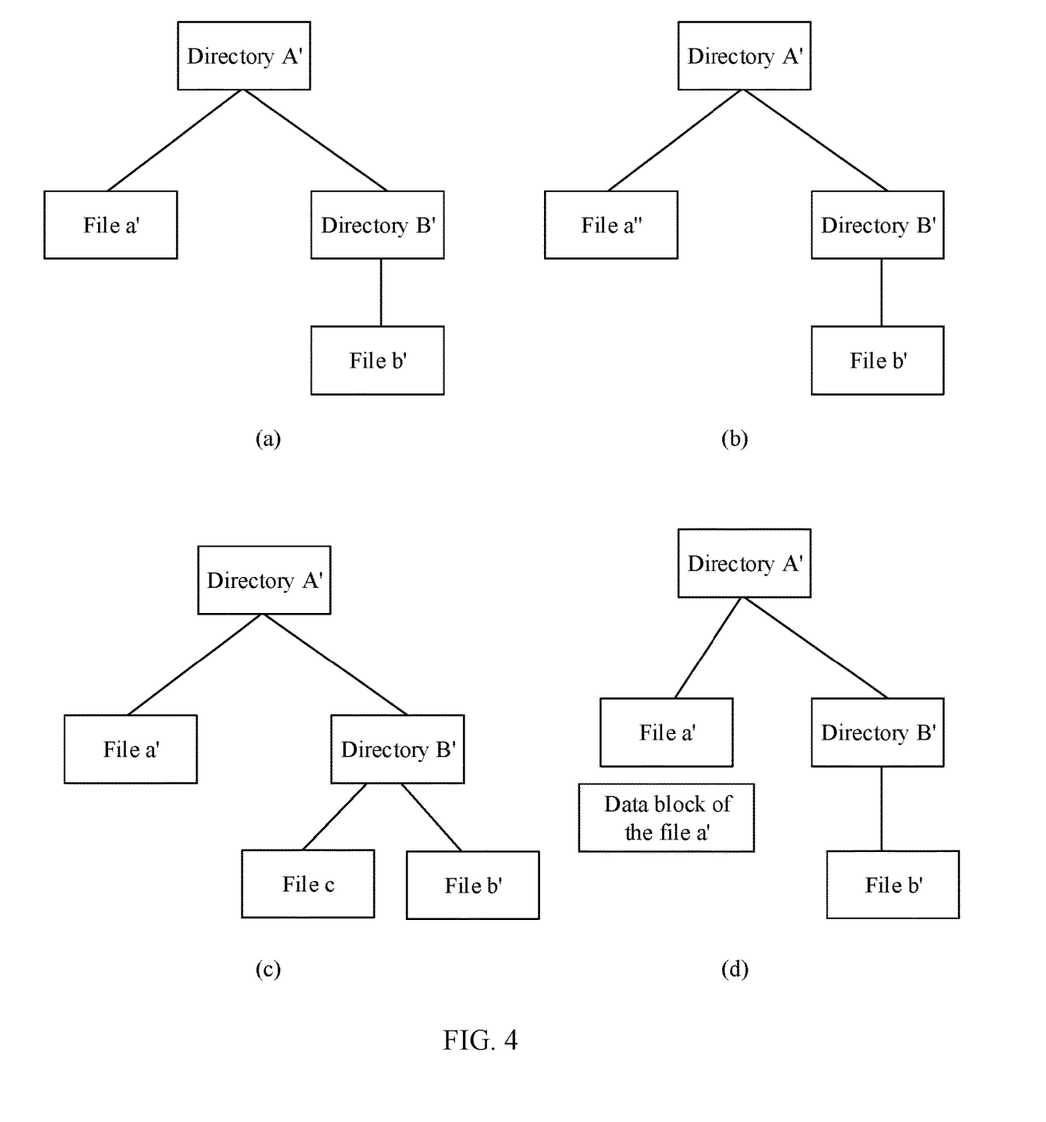
FIG. 4 is a schematic diagram of an example of a cloned file system created in a storage system 110 according to an embodiment of this application.

In another example, when cloning the metadata of each file, the management module 111 may update the file name of each file according to the preset rule, to create the cloned file system shown in (a) in FIG. 4. In this way, after receiving the data read request again, the management module 111 first needs to determine, based on the one-to-one mapping relationship between the source metadata and the cloned metadata that is stored in the storage system 110, that a data block of the file a' is to be read in the data read request, and then determines, based on a bitmap corresponding to the file a', whether the to-be-read data block is stored in the storage system 110.

S503: When the to-be-read data block is not stored in the storage system 110, the management module 111 sends a first data obtaining request to the source storage system 100.

The first data obtaining request may include the identifier of the to-be-read data block. The identifier of the to-be-read data block is the same as that in step S501, and details are not described herein again. In an example, the identifier of the to-be-read data block includes the file a, the start address is 0, and the length is 10. In other words, the to-be-read data block is the first 80 KB data block of the file a.

It should be noted that the first data obtaining request may be the data read request sent by the client in step S501. In other words, the data read request is directly forwarded. Alternatively, the first data obtaining request may be a data obtaining request obtained by the management module 111 after parsing the received data read request. This is not limited herein.

S504: The management module 101 obtains the to-be-read data block, and sends the to-be-read data block to the management module 111.

After obtaining the data obtaining request, the management module 101 obtains the to-be-read data block based on the identifier that is of the to-be-read data block and carried in the data obtaining request, for example, obtains the first 80 KB data block of the file a; and sends the data block to the management module 111.

S505: The management module 111 stores the to-be-read data block.

After obtaining the to-be-read data block, the management module 111 stores the to-be-read data block in storage space corresponding to the to-be-read data block. For example, if the first 80 KB data block of the file a is stored in sectors 1 to 20 of the storage node 4, the management module 111 writes the to-be-read data block into the sectors 1 to 20 of the storage node 4. In this case, a data layout shown in (d) in FIG. 4 may be obtained. In (d) in FIG. 4, the file data block corresponding to the file a' is displayed below the file a', to indicate that the data block included in the file is already stored in the destination storage system 110.

Further, because the data block included in the file a is already stored in the storage system 110, the management module 111 changes the bitmap corresponding to the file a, for example, sets the values of the first 20 bits in the bitmap corresponding to the file a to 1, to indicate that the first 80 KB data block of the file a is already stored in storage space corresponding to the file a.

S506: The management module 111 sends the to-be-read data block to the client.

In this embodiment of this application, step S505 and step S506 are not subject to an execution sequence.

In addition, if the to-be-read data block is stored in the destination storage system 110, the management module 111 does not need to perform step S503 to step S505, but directly obtains the to-be-read data block from the corresponding storage space, and sends the to-be-read data block to the client. Therefore, step S503 to step S505 are optional steps, and are represented by dashed lines in FIG. 5.

S507: The management module 111 sends a second data obtaining request to the source storage system 100, where the second data obtaining request includes an identifier of a pre-read data block.

The management module 111 may further prefetch some data to a cache of the management module 111 based on the data read request. For example, the data read request is used to read the first 80 KB data block of the file a. In this case, the management module 111 speculates, according to a preset prefetch rule, that the user will subsequently read a last 80 KB data block of the file a, and the management module 111 may send the second data obtaining request to the storage system 100. The second data obtaining request carries an identifier of the last 80 KB data block of the file a.

S508: The management module 101 obtains the pre-read data block, and sends the pre-read data block to the management module 111.

The management module 101 obtains the last 80 KB data block of the file a based on the second data obtaining request, and sends the last 80 KB data block of the file a to the management module 111.

S509: The management module 111 caches the pre-read data block.

After receiving the pre-read data block, the management module 111 stores the pre-read data block in the cache of the management module 111. In this way, after subsequently receiving a corresponding data read request used to obtain the pre-read data block, the management module 111 may directly obtain the data block from the cache and send the data block to the client, to reduce a delay.

Step S507 to step S509 are optional steps, and are represented by dashed lines in FIG. 5.

When the cloned file system in the storage system 110 is a readable and writable file system, the management module 111 of the storage system 110 may further process a write request. In this embodiment of this application, the write request may include a data write request, a file creation request, a file deletion request, or the like. In the following, an example in which the write request is the data write request is used.

Figure 6:
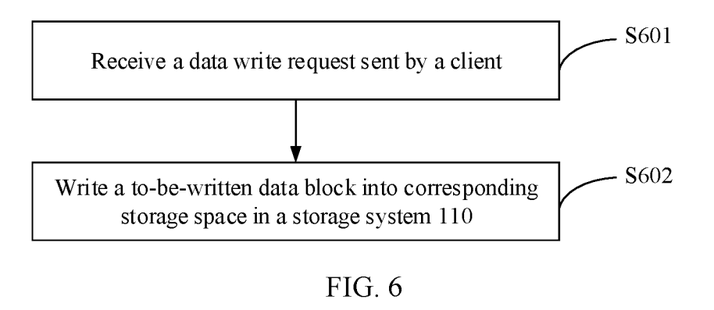
FIG. 6 is a flowchart of processing a data write request by a cloned file system according to an embodiment of this application.

FIG. 6 is a flowchart of processing the data write request by the storage system 110. The flowchart is described as follows:

S601: The management module 111 of the storage system 110 receives a data write request sent by the client, where the data write request includes a to-be-written data block and an identifier of the to-be-written data block.

In this embodiment of this application, the identifier of the to-be-written data block includes a file name of a file to which the to-be-written data block belongs and a size of the to-be-written data block. In an example, the identifier of the to-be-written data block includes the file a, and the size of the to-be-written data block is 80 KB.

S602: The management module 111 writes the to-be-written data block into corresponding storage space in the storage system 110.

In an example, if the management module 111 determines that the to-be-written data block is a data block corresponding to the file a, the management module 111 stores the to-be-written data block in the storage space corresponding to the file a. For example, the storage space of the file a is sectors 1 to 40 of the storage node 4. In this case, the management module sequentially writes the to-be-written data block into the sectors 1 to 40.

It should be noted that, if the data block corresponding to the file a is already stored in the storage system 110, the management module 111 may replace the previously stored data block corresponding to the file a with the to-be-written data block in an overwrite manner.

In some other embodiments, when cloning the metadata of each file, the management module 111 may update the file name of each file according to the preset rule, to create the cloned file system shown in (a) in FIG. 4. In this way, after receiving the data write request again, the management module 111 first needs to determine, based on the one-to-one mapping relationship between the source metadata and the cloned metadata that is stored in the storage system 110 and the identifier that is of the to-be-written data block and that is included in the data write request, metadata corresponding to the to-be-written data block. For example, if the file name carried in the data write request is the file a, and the mapping relationship includes that the file a corresponds to the file a', the management module 111 determines that the data block carried in the data write request is a data block corresponding to the file a'. Then, the to-be-written data block is written into storage space corresponding to the metadata.

When the write request is the file creation request, the file deletion request, or the like, the management module 111 may create a new file or delete a file in the cloned file system by using steps similar to those in FIG. 2 or FIG. 6. Details are not described herein again.

In the foregoing embodiments provided in this application, to implement functions in the method provided in the embodiments of this application, the storage system may include a hardware structure and/or a software module, and implement the functions in a form of the hardware structure, the software module, or a combination of the hardware structure and the software module. Whether a function of the foregoing functions is performed by the hardware structure, the software module, or the combination of the hardware structure and the software module depends on specific application and a design constraint of the technical solution.

Figure 7:
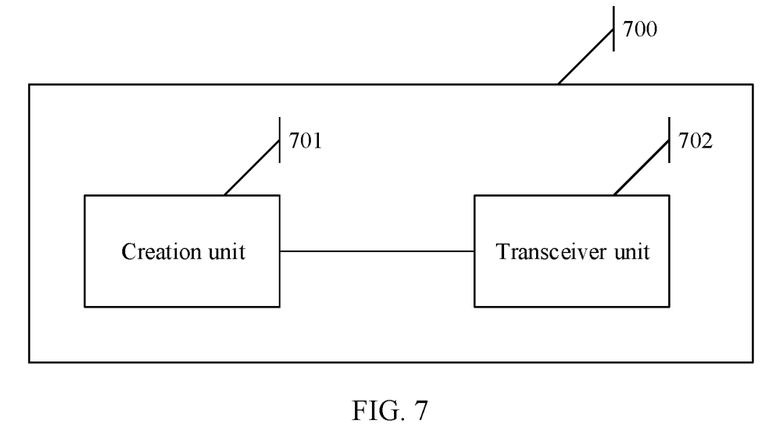
FIG. 7 is a schematic diagram of a structure example of a file system cloning apparatus according to an embodiment of this application.

FIG. 7 is a schematic diagram of a structure of a file system cloning apparatus 700. The file system cloning apparatus 700 may be a device in which the management module 111 in the embodiment shown in FIG. 2, FIG. 5, or FIG. 6 is located, or may be located in a device in which the management module 111 is located, and may be configured to implement a function of the management module 111. The file system cloning apparatus 700 may be a hardware structure or a combination of a hardware structure and a software module.

The file system cloning apparatus 700 includes at least one memory, configured to store a program instruction and/or data. The file system cloning apparatus 700 further includes at least one processor. The at least one processor is coupled to the memory, and the at least one processor may execute the program instruction stored in the memory.

The file system cloning apparatus 700 may include a creation unit 701 and a transceiver unit 702.

The creation unit 701 may invoke the processor to execute the program instruction stored in the memory, to perform step S203 and step S206 in the embodiment shown in FIG. 2, or step S502, step S505, and step S509 in the embodiment shown in FIG. 5, or step S602 in the embodiment shown in FIG. 6, and/or another process used to support the technology described in this specification.

The transceiver unit 702 may invoke the processor to execute the program instruction stored in the memory, to perform step S202 and step S205 in the embodiment shown in FIG. 2, or step S501, step S503, step S504, and step S506 to step S508 in the embodiment shown in FIG. 5, or step S601 in the embodiment shown in FIG. 6, and/or another process used to support the technology described in this specification. The transceiver unit 702 is used by the file system cloning apparatus 700 to communicate with another module, and may be a circuit, a component, an interface, a bus, a software module, a transceiver, or any other apparatus that can implement communication.

All related content of the steps in the foregoing method embodiments may be cited in function descriptions of corresponding function modules. Details are not described herein again.

Division into modules in the embodiment shown in FIG. 7 is an example, is merely logical function division, and may be other division in an actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 8:
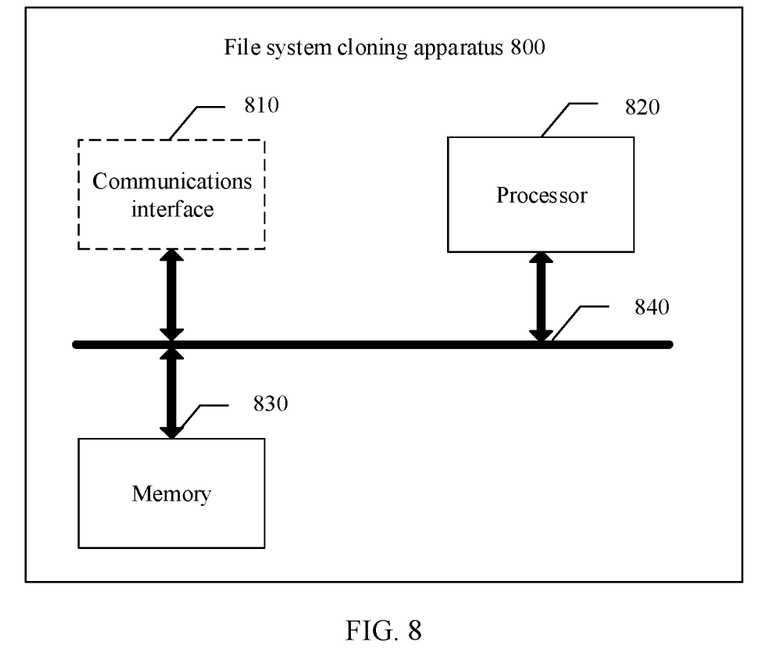
FIG. 8 is a schematic diagram of another structure example of a file system cloning apparatus according to an embodiment of this application.

FIG. 8 shows a file system cloning apparatus 800 according to an embodiment of this application. The file system cloning apparatus 800 may be a device in which the management module 111 in the embodiment shown in FIG. 2, FIG. 5, or FIG. 6 is located, or may be located in a device in which the management module 111 is located, and may be configured to implement a function of the management module 111.

The file system cloning apparatus 800 includes at least one processor 820, configured to implement or support the file system cloning apparatus 800 to implement the function of the management module 111 in the method provided in the embodiments of this application. For example, the processor 820 may create a cloned file system based on first information. For details, refer to detailed descriptions in the method example. Details are not described herein.

The file system cloning apparatus 800 may further include at least one memory 830, configured to store a program instruction and/or data. The memory 830 is coupled to the processor 820. The coupling in this embodiment of this application is an indirect coupling or a communication connection between apparatuses, units, or modules, may be in an electrical form, a mechanical form, or another form, and is used for information exchange between the apparatuses, the units, or the modules. The processor 820 may operate with the memory 830. The processor 820 may execute the program instruction stored in the memory 830. At least one of the at least one memory may be included in the processor.

The file system cloning apparatus 800 may further include a communications interface 810, configured to communicate with another device through a transmission medium, so that the file system cloning apparatus 800 may communicate with the another device. For example, the another device may be a client or a storage device. The processor 820 may send and receive data through the communications interface 810.

In this embodiment of this application, a specific connection medium between the communications interface 810, the processor 820, and the memory 830 is not limited. In this embodiment of this application, the memory 830, the processor 820, and the communications interface 810 are connected through a bus 840 in FIG. 8, and the bus is represented by a thick line in FIG. 8. A connection manner between other components is schematically described, and is not limited thereto. The bus may be classified into an address bus, a data bus, a control bus, and the like. For ease of representation, only one thick line is used to represent the bus in FIG. 8, but this does not mean that there is only one bus or only one type of bus.

In this embodiment of this application, the processor 820 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the methods disclosed with reference to the embodiments of this application may be directly performed by a hardware processor, or may be performed by a combination of hardware and software modules in the processor.

In this embodiment of this application, the memory 830 may be a non-volatile memory, such as a hard disk drive (HDD) or a solid-state drive (SSD), or may be a volatile memory, such as a random access memory (RAM). The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instruction and/or the data.

An embodiment of this application further provides a computer-readable storage medium, including an instruction. When the instruction is run on a computer, the computer is enabled to perform the method performed by the management module 111 in the embodiment shown in FIG. 2, FIG. 5, or FIG. 6.

An embodiment of this application further provides a computer program product including an instruction. When the instruction is run on a computer, the computer is enabled to perform the method performed by the management module 111 in the embodiment shown in FIG. 2, FIG. 5, or FIG. 6.

An embodiment of this application provides a storage system. The storage system includes a source storage system and a destination storage system. The destination storage system includes the management module 111 in the embodiment shown in FIG. 2, FIG. 5, or FIG. 6.

All or some of the methods in the embodiments of this application may be implemented through software, hardware, firmware, or any combination thereof. When software is used to implement the methods, all or some of the methods may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

What is claimed is:

1. A file system cloning method, comprising:
   receiving, by a destination storage system, first information sent by a source storage system, wherein a file system runs in the source storage system, and the first information indicates a data layout of the file system, wherein the first information comprises semantic analysis information of metadata of a plurality of files in the file system, and semantic analysis information of metadata of each of the plurality of files comprises an identifier of the metadata of the file, an operation corresponding to the metadata of the file, and data for creating the metadata of the file; and
   creating, by the destination storage system, a cloned file system of the file system based on the first information, wherein the creating the cloned file system comprises creating cloned metadata of cloned files in the cloned file system according to the semantic analysis information, wherein the creating cloned metadata of cloned files in the cloned file system comprises:
   identifying, in the metadata, a first file name that represents a first directory in the file system according to the semantic analysis information of the metadata;
   updating the first file name to a second file name representing a second directory in the cloned file system, wherein the second file name is different from the first file name; and
   including the second file name in the cloned metadata.

2. The method according to claim 1, wherein the method further comprises:
   receiving, by the destination storage system, second information sent by the source storage system, wherein the second information comprises metadata of a changed file in the file system or semantic analysis information of the metadata of the changed file; and
   updating, by the destination storage system, the cloned file system based on the second information.

3. The method according to claim 1, wherein the method further comprises:

receiving, by the destination storage system, a data read request, wherein the data read request comprises an identifier of a to-be-read data block;

when determining that the to-be-read data block is not stored in the destination storage system, sending, by the destination storage system, a first data obtaining request to the source storage system, wherein the first data obtaining request comprises the identifier of the to-be-read data block; and receiving, by the destination storage system, the to-be-read data block from the source storage system, and storing the to-be-read data block.

4. The method according to claim 3, wherein the method further comprises:

determining, by the destination storage system, a pre-read data block according to a prefetch rule and the data read request;

sending, by the destination storage system, a second data obtaining request to the source storage system, wherein the second data obtaining request comprises an identifier of the pre-read data block; and receiving, by the destination storage system, the pre-read data block from the source storage system, and storing the pre-read data block in the destination storage system.

5. A file system cloning apparatus, comprising:
at least one processor; and
one or more memories coupled to the at least one processor and storing programming instructions for execution by the at least one processor to cause the apparatus to:
receive first information sent by a source storage system, wherein a file system runs in the source storage system, and the first information indicates a data layout of the file system, wherein the first information comprises semantic analysis information of metadata of a plurality of files in the file system, and semantic analysis information of metadata of each of the plurality of files comprises an identifier of the metadata of the file, an operation corresponding to the metadata of the file, and data for creating the metadata of the file; and
create a cloned file system of the file system based on the first information, wherein the creating the cloned file system comprises creating cloned metadata of cloned files in the cloned file system according to the semantic analysis information, wherein the creating cloned metadata of cloned files in the cloned file system comprises:
identifying, in the metadata, a first file name that represents a first directory in the file system according to the semantic analysis information of the metadata;
updating the first file name to a second file name representing a second directory in the cloned file system, wherein the second file name is different from the first file name; and
including the second file name in the cloned metadata.

6. The file system cloning apparatus according to claim 5, wherein the programming instructions, when executed by the at least one processor, cause the apparatus to:
receive second information sent by the source storage system, wherein the second information comprises metadata of a changed file in the file system or semantic analysis information of the metadata of the changed file; and
update the cloned file system based on the second information.

7. The file system cloning apparatus according to claim 5, wherein the programming instructions, when executed by the at least one processor, cause the apparatus to:
receive a data read request, wherein the data read request comprises an identifier of a to-be-read data block;
send a first data obtaining request to the source storage system, wherein the first data obtaining request comprises the identifier of the to-be-read data block when determining that the to-be-read data block is not stored in the file system cloning apparatus; and
receive the to-be-read data block from the source storage system, and storing the to-be-read data block.

8. The file system cloning apparatus according to claim 7, wherein the programming instructions, when executed by the at least one processor, cause the apparatus to:
determine a pre-read data block according to a prefetch rule and the data read request;
send a second data obtaining request to the source storage system, wherein the second data obtaining request comprises an identifier of the pre-read data block; and
receive the pre-read data block from the source storage system, and storing the pre-read data block in the file system cloning apparatus.

9. A non-transitory computer storage medium, wherein the non-transitory computer storage medium stores computer-executable instructions, and wherein the instructions, when executed by one or more processors, cause a computer to perform operations comprising:
receiving first information sent by a source storage system, wherein a file system runs in the source storage system, and the first information indicates a data layout of the file system, wherein the first information comprises semantic analysis information of metadata of a plurality of files in the file system, and semantic analysis information of metadata of each of the plurality of files comprises an identifier of the metadata of the file, an operation corresponding to the metadata of the file, and data for creating the metadata of the file; and
creating a cloned file system of the file system based on the first information, wherein the creating the cloned file system comprises creating cloned metadata of cloned files in the cloned file system according to the semantic analysis information, wherein the creating cloned metadata of cloned files in the cloned file system comprises:
identifying, in the metadata, a first file name that represents a first directory in the file system according to the semantic analysis information of the metadata;
updating the first file name to a second file name representing a second directory in the cloned file system, wherein the second file name is different from the first file name; and
including the second file name in the cloned metadata.

10. The non-transitory computer storage medium according to claim 9, wherein the operations comprise:
receiving second information sent by the source storage system, wherein the second information comprises metadata of a changed file in the file system or semantic analysis information of the metadata of the changed file; and
updating the cloned file system based on the second information.

11. The non-transitory computer storage medium according to claim 9, wherein the operations comprise:

receiving a data read request, wherein the data read request comprises an identifier of a to-be-read data block;

sending a first data obtaining request to the source storage system, wherein the first data obtaining request comprises the identifier of the to-be-read data block when determining that the to-be-read data block is not stored in the computer; and receiving the to-be-read data block from the source storage system, and storing the to-be-read data block.

12. The non-transitory computer storage medium according to claim 11, wherein the operations comprise:

determining a pre-read data block according to a prefetch rule and the data read request;

sending a second data obtaining request to the source storage system, wherein the second data obtaining request comprises an identifier of the pre-read data block; and receiving the pre-read data block from the source storage system, and storing the pre-read data block in the computer.

* * * * *